US012664955B2

(12) United States Patent
Fernandez Orellana et al.

(10) Patent No.: US 12,664,955 B2
(45) Date of Patent: Jun. 23, 2026

(54) METHOD, ELECTRONIC DEVICE, AND COMPUTER PROGRAM PRODUCT FOR ADJUSTING FIELD OF VIEW OF SCREEN

(71) Applicant: Dell Products L.P., Round Rock, TX (US)

(72) Inventors: Pedro Fernandez Orellana, Shanghai (CN); Qiang Chen, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 246 days.

(21) Appl. No.: 18/581,536

(22) Filed: Feb. 20, 2024

(65) Prior Publication Data

US 2025/0239234 A1 Jul. 24, 2025

(30) Foreign Application Priority Data

Jan. 24, 2024 (CN) .......................... 202410102816.9

(51) Int. Cl.
$G09G\ 3/36$ (2006.01)
$G06F\ 21/84$ (2013.01)
(Continued)

(52) U.S. Cl.
CPC .............. $G09G\ 3/36$ (2013.01); $G06F\ 21/84$ (2013.01); $G01S\ 7/412$ (2013.01); $G01S\ 13/42$ (2013.01);
(Continued)

(58) Field of Classification Search
CPC .. G09G 3/36; G09G 2358/00; G09G 2320/08; G06F 21/84; G01S 7/412; G01S 13/42
See application file for complete search history.

(56) References Cited

U.S. PATENT DOCUMENTS 7,352,347 B2 * 4/2008 Fergason ............ G02F 1/13363
348/E13.059
8,600,110 B1 * 12/2013 Chan ...................... G06F 21/84
382/106

(Continued)

OTHER PUBLICATIONS

Wikipedia, "Radar," https://en.wikipedia.org/wiki/Radar, Nov. 10, 2022, 29 pages.

(Continued)

*Primary Examiner* — Antonio A Caschera
(74) *Attorney, Agent, or Firm* — Ryan, Mason & Lewis, LLP

(57) ABSTRACT

In an illustrative embodiment, a method for adjusting a field of view of a screen of an electronic device includes detecting a target object within a detection range by using a radar apparatus of the electronic device. The method further includes determining whether the target object is a person by using a biometric signal in a detection signal emitted by the radar apparatus in response to detecting the target object; and determining a distance and an angle of the target object relative to the electronic device by using an azimuth signal in the detection signal in response to the target object being a person. The method further includes adjusting the field of view of the screen of the electronic device according to a visual mode of the electronic device based on the distance, a distance threshold, the angle, and a plurality of angle thresholds.

20 Claims, 6 Drawing Sheets

(51) Int. Cl.
    *G01S 7/41* (2006.01)
    *G01S 13/42* (2006.01)
(52) U.S. Cl.
    CPC ... *G09G 2320/068* (2013.01); *G09G 2320/08* (2013.01); *G09G 2358/00* (2013.01)

(56) References Cited

U.S. PATENT DOCUMENTS

| | | | |
|---|---|---|---|
| 11,663,345 B2* | 5/2023 | Sengupta | G06F 21/604 |
| | | | 726/28 |
| 12,235,342 B2* | 2/2025 | Fernandez | G01S 13/4427 |
| 2022/0268916 A1* | 8/2022 | Nagpal | H04R 1/406 |

OTHER PUBLICATIONS

M. Belfiore, "Experimental Radar Technology Monitors Vital Signs without Contact," https://www.dell.com/nl-nl/perspectives/experimental-radar-technology-monitors-vital-signs-without-contact/, May 11, 2022, 3 pages.

Y. J. Lim et al., "Viewing Angle Controllable Liquid Crystal Display with High Transmittance," Optics Express, vol. 18, No. 7, Mar. 17, 2010, pp. 6824-6830.
L. Wang et al., "Viewing Angle Controllable LCD with Specified Array Structure for Ultra High Definition Display," Society for Information Display Symposium Digest of Technical Papers, vol. 49, No. 1, May 30, 2018, Abstract Only.
Y. Hisatake et al., "Viewing Angle Controllable LCD using Variable Optical Compensator and Variable Diffuser," Society for Information Display Symposium Digest of Technical Papers, vol. 36, No. 1, Jul. 5, 2012, Abstract Only.
Vintez, "22 Inch Inch Computer Privacy Screen Filter for 16:9 Widescreen Computer Monitor—Anti-Glare—Anti- Scratch Protector Film—Data confidentiality Shield," https://www.amazon.com/Inch-Widescreen-Anti-Glare-Anti- Scratch-confidentiality/dp/B07VBSFSCH/ref, Accessed Apr. 20, 2023, 10 pages.
U.S. Appl. No. 17/984,886 filed in the name of Pedro Fernandez et al. filed Nov. 10, 2022, and entitled "Method, Electronic Device, and Computer Program Product for Monitoring Authentication Based on Radar."

* cited by examiner

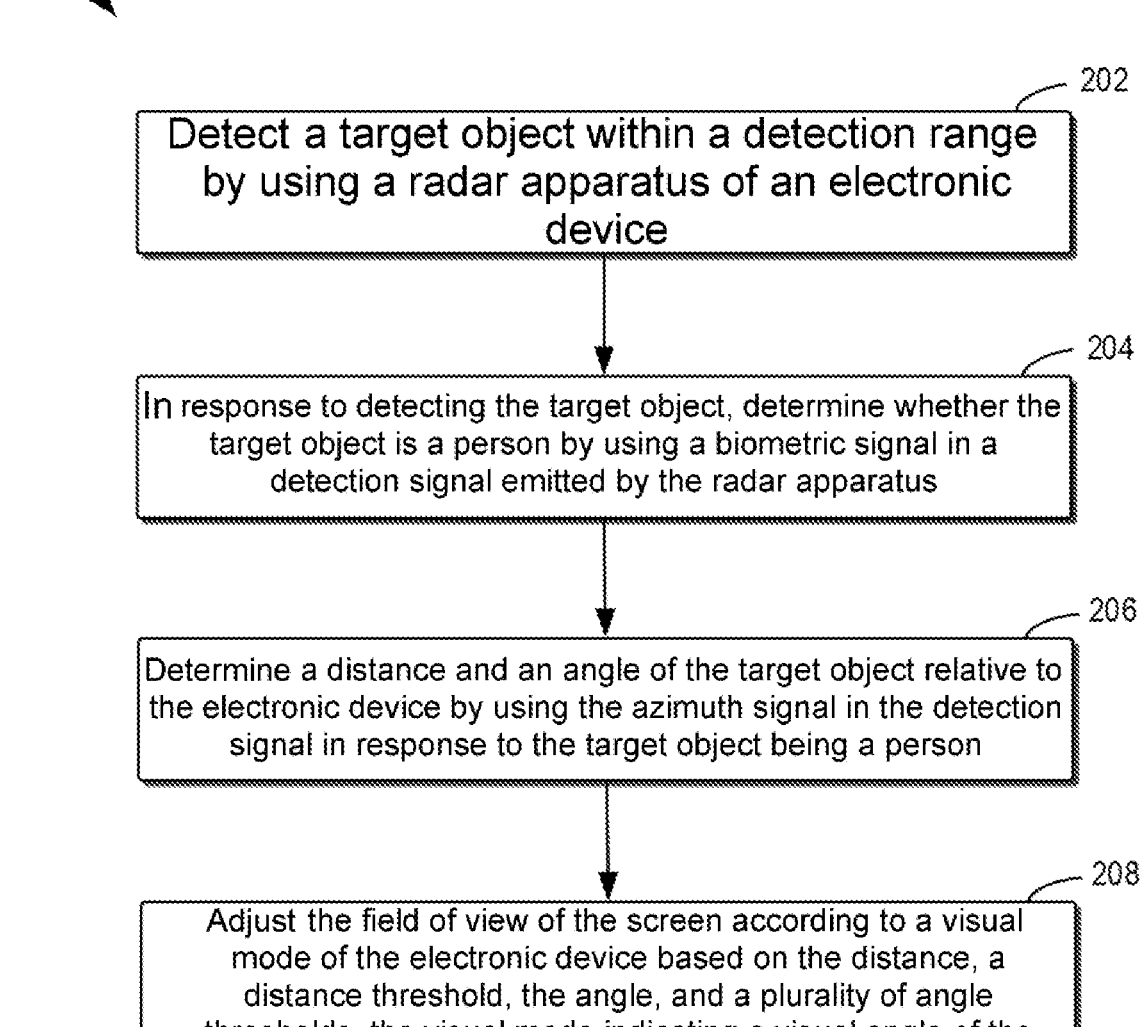

200

202
Detect a target object within a detection range by using a radar apparatus of an electronic device 204
In response to detecting the target object, determine whether the target object is a person by using a biometric signal in a detection signal emitted by the radar apparatus 206
Determine a distance and an angle of the target object relative to the electronic device by using the azimuth signal in the detection signal in response to the target object being a person 208
Adjust the field of view of the screen according to a visual mode of the electronic device based on the distance, a distance threshold, the angle, and a plurality of angle thresholds, the visual mode indicating a visual angle of the screen of the electronic device

FIG. 2

METHOD, ELECTRONIC DEVICE, AND COMPUTER PROGRAM PRODUCT FOR ADJUSTING FIELD OF VIEW OF SCREEN

RELATED APPLICATION

The present application claims priority to Chinese Patent Application No. 202410102816.9, filed Jan. 24, 2024, and entitled "Method, Electronic Device, and Computer Program Product for Adjusting Field of View of Screen," which is incorporated by reference herein in its entirety.

FIELD

Embodiments of the present disclosure relate to the field of electronic devices, and more specifically, to a method, an electronic device, and a computer program product for adjusting a field of view of a screen.

BACKGROUND

Electronic devices are ubiquitous in our daily life. For example, such electronic devices include personal computers, smartphones, enterprise equipment, ATMs, and other terminals. Private and leisure activities on electronic devices are not limited to private and safe places. It is common to have private conversations in public places, work in coffee shops, or view sensitive information in public. However, in all these activities, privacy is still a major problem, so that an instinctive "vigilant" behavior is taken.

A liquid crystal display (LCD) is a common type of display in smartphones, monitors, televisions, and the like. Typically, a viewing angle within a range of plus or minus 30 degrees is the best position for viewing any type of display, but this varies greatly among specific techniques and manufacturers.

SUMMARY

Embodiments of the present disclosure provide a solution for adjusting a field of view of a screen.

In a first aspect of the present disclosure, a method is provided. The method includes detecting a target object within a detection range by using a radar apparatus of an electronic device. The method further includes determining whether the target object is a person by using a biometric signal in a detection signal emitted by the radar apparatus in response to detecting the target object. The method further includes determining a distance and an angle of the target object relative to the electronic device by using an azimuth signal in the detection signal in response to the target object being a person. The method further includes adjusting a field of view of a screen of the electronic device according to a visual mode of the electronic device based on the distance, a distance threshold, the angle and a plurality of angle thresholds, where the visual mode indicates a visual angle of the screen of the electronic device.

In a second aspect of the present disclosure, an electronic device is provided. The electronic device includes at least one processor and a memory coupled to the at least one processor. The memory has instructions stored therein, wherein the instructions, when executed by the at least one processor, cause the electronic device to perform actions. The actions include detecting a target object within a detection range by using a radar apparatus of the electronic device. The actions further include determining whether the target object is a person by using a biometric signal in a detection signal emitted by the radar apparatus in response to detecting the target object. The actions further include determining a distance and an angle of the target object relative to the electronic device by using an azimuth signal in the detection signal in response to the target object being a person. The actions further include adjusting a field of view of a screen of the electronic device according to a visual mode of the electronic device based on the distance, a distance threshold, the angle and a plurality of angle thresholds, where the visual mode indicates a visual angle of the screen of the electronic device.

In a third aspect of the present disclosure, a computer program product is provided. The computer program product is tangibly stored on a non-transitory computer-readable medium and includes machine-executable instructions. The machine-executable instructions, when executed by a machine, cause the machine to perform the method according to the first aspect.

This Summary is provided to introduce a selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

By additional description of example embodiments of the present disclosure, provided herein with reference to the accompanying drawings, the above and other objectives, features, and advantages of the present disclosure will become more apparent, where identical reference numerals generally represent identical components in the example embodiments of the present disclosure. In the accompanying drawings:

FIG. 2 is a flowchart of an example method for adjusting a field of view of a screen according to an embodiment of the present disclosure;

DETAILED DESCRIPTION

Figure 1:
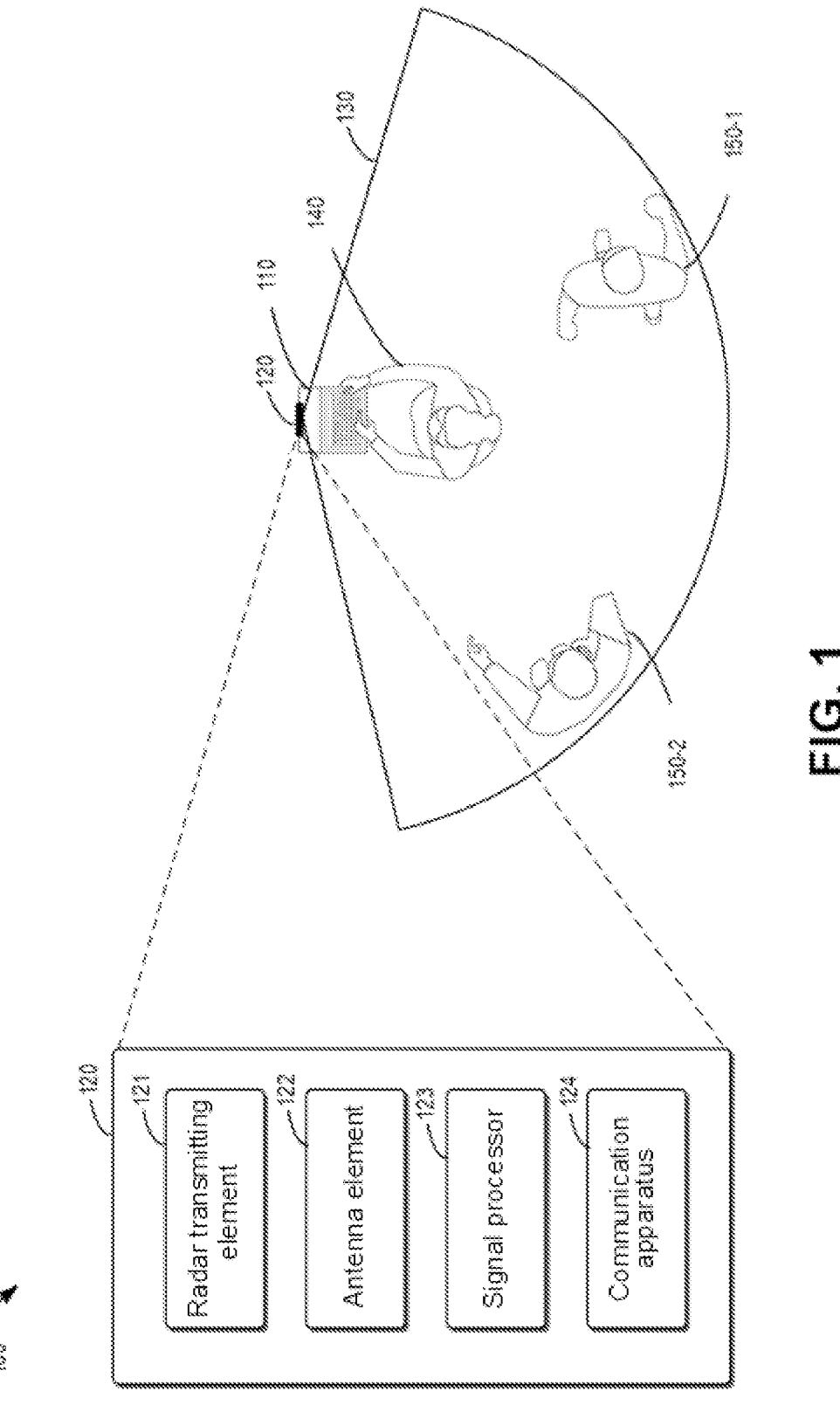
FIG. 1 is a schematic diagram of an example environment in which embodiments of the present disclosure can be implemented.

Principles of the present disclosure will be described below with reference to several example embodiments illustrated in the accompanying drawings. Although the accompanying drawings show illustrative embodiments of the present disclosure, it is to be understood that these embodiments are merely described to enable those skilled in the art to better understand and further implement the present disclosure, and not to limit the scope of the present disclosure in any way.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" mean "at least one example embodiment." The term "another embodiment" means "at least one additional embodiment." The terms "first," "second," and the like may refer to different or identical objects. Other explicit and implicit definitions may also be included below.

As mentioned above, a viewing angle within a range of plus or minus 30 degrees is typically the best position for viewing any type of display without reducing the quality/ visibility. On the other hand, conventionally, a biometric identification function of a radar has been used for authentication of some electronic devices. The application of these authentications is usually very simple.

Another possible approach involves attaching a passive privacy filter to a screen. However, passive privacy filters tend to be inflexible and unsuitable for daily use of electronic devices, and most of them are aimed at enterprise users and generally inconvenient to use. Generally speaking, people like to have as wide a field of view as possible on a device, and only reduce the field of view when necessary in some scenarios.

Despite these approaches, work or personal use of devices remains susceptible to a threat to privacy. Personal devices are used in public areas every day, and generally speaking, privacy is a concern for everyone when dealing with private and sensitive tasks. Therefore, a solution is needed that can automatically detect potential snooping and reduce the field of view of a screen accordingly to avoid snooping.

In view of this, an embodiment of the present disclosure provides a solution to adjust a field of view of a screen of an electronic device to solve one or more of the above problems and other potential problems. In this solution, an electronic device detects a target object within a detection range by using a radar apparatus of the electronic device. The electronic device determines whether the target object is a person by using a biometric signal in a detection signal emitted by the radar apparatus in response to detecting the target object. The electronic device determines a distance and an angle of the target object relative to the electronic device by using an azimuth signal in the detection signal in response to the target object being a person. The electronic device also adjusts the field of view of the screen of the electronic device according to a visual mode of the electronic device based on the distance, a distance threshold, the angle, and a plurality of angle thresholds, where the visual mode indicates a visual angle of the screen of the electronic device. In this way, potential snooping can be automatically detected, and the field of view of the screen can be reduced accordingly to avoid snooping. In some embodiments, the field of view can also be seamlessly adapted based on a predetermined visual mode.

FIG. 1 is a schematic diagram of an example environment 100 in which embodiments of the present disclosure can be implemented. As described in FIG. 1, a radar apparatus 120 is installed on an electronic device 110. A user 140 is accessing the electronic device 110 from a position in front of a display apparatus or other type of screen of the electronic device 110. The user 140 completes an authentication utilizing, for example, biometrics detected by the radar apparatus 120. The radar apparatus 120 emits a radar field and forms a detection range 130. The radar apparatus 120 can detect positions of all objects within the detection range 130, and can detect biometric signals of living things within the detection range 130. For example, in the example shown in FIG. 1, the radar apparatus 120 can detect a person 150-1 and a person 150-2 in the detection range 130. Here, the electronic device 110 may include, for example, a laptop computer, a television, a smartphone, a tablet computer, and a desktop computer, but other devices may also be used, such as a home automation and control system, an entertainment system, an audio system, a home appliance, a security system, a netbook, and an electronic reader. The electronic device 110 may be wearable, non-wearable but mobile, or relatively immobile (e.g., a desktop computer or an entertainment system), which is not intended to be limited by the present disclosure.

An example structure of the radar apparatus 120 is shown in FIG. 1. The radar apparatus 120 may be part of the electronic device 110, or the radar apparatus 120 may be separate from the electronic device 110.

The radar apparatus 120 includes a radar transmitting element 121, an antenna element 122, a signal processor 123, and a communication apparatus 124. Typically, the radar transmitting element 121 provides a radar field. For example, the radar field can be configured to be reflected from a fabric (such as clothing). The radar field can also be configured to penetrate fabrics or other obstacles and be reflected from human skin or tissues. These fabrics or obstacles may include wood, glass, plastic, cotton, wool, nylon and similar fibers, and the like and are reflected from human tissues such as the face or body of a person.

The radar field provided may be a wide field, a narrow field, a surface field, a volume field, a shaping field (e.g., a hemisphere, a cube, a sector, a cone, or a cylinder), a steering field, a non-steering field, a close-distance (near) field, or a medium or long-distance field. Therefore, the radar field provided by the radar transmitting element 121 may be of a small size, such as about one meter or less, or may be of a medium size, such as about one to 30 meters. It should be understood that these sizes are merely exemplary, and any other suitable size or range of the radar field can be used.

The radar transmitting element 121 can also use a continuous wave signal or a pulsed Doppler signal, and use various frequencies, update rates, pulse widths, interpulse periods (IPPs), transmitting powers, and modulations. For example, the radar transmitting element 121 can transmit continuously modulated radiation, ultra-wideband radiation, or sub-millimeter frequency radiation. In some embodiments, the radar transmitting element 121 can form radiation in beams. The beams can help the antenna element 122 and the signal processor 123 to determine which of these beams are interrupted, and thus determine the position of a specific object or interaction within the radar field.

The antenna element 122 can receive reflections from objects in the radar field or sense objects in the radar field. In some embodiments, the reflections include those from human tissues (such as the face or body of a person) in the radar field or from movements of the head, leg, arm, hand, or torso of a person. In addition, the reflections may also include those from clothing or other materials worn by the human in the radar field.

The signal processor 123 can process the reflections received within the radar field to provide authentication data associated with the received reflections. The authentication data is data based on radar reflections which can be used to determine whether an object in the radar field is a person, and in some implementations, whether the person is a specific person who can access the electronic device 110 (e.g., to authenticate the person as an authorized user). In some embodiments, the antenna element 122 can receive reflections from multiple human tissue targets in the radar field, and the signal processor 123 is configured to process the received interactions sufficient to distinguish one of the multiple person tissue targets from another one of the multiple human tissue targets. These targets may include the face, head, torso, hand, arm, and leg of the same person or different persons. As such, many different persons can be distinguished from one another.

The communication apparatus 124 may include a bus or a remote signal transceiver. Thus, the radar apparatus 120 can function as part of the electronic device 110 or as a wireless peripheral. The solution to adjust a field of view of a screen according to the present disclosure is to be described below in detail with reference to FIGS. 2 to 5.

FIG. 2 is a flowchart of an example method 200 for adjusting a field of view of a screen according to an embodiment of the present disclosure. The method 200 can be performed by, for example, the electronic device 110 in FIG. 1.

At 202, a target object is detected within a detection range by using a radar apparatus of the electronic device. At 204, if the target object is detected, it is determined whether the target object is a person by using a biometric signal in a detection signal emitted by the radar apparatus. For example, the radar apparatus 120 of the electronic device 110 illustratively provides a radar field and forms a certain detection range. The radar apparatus 120 detects a detection signal of the object within the detection range by receiving a signal reflected by the object. The detection signal may include biometric signals (e.g., a respiratory frequency signal and a heart rate signal of the object) and signals reflected from various parts of the object's body, such as an azimuth signal.

Upon receiving the signal, the electronic device 110 can determine whether the object is a person based on the signal. The determination can be made, for example, by comparing the reflection from the object with stored reference data, and determining that the object is a person based on the comparison result. For example, the stored reference data may include a radar reflection profile of an exemplary human body, which may be used for distinguishing the reflection from a person from the reflections from other objects. The stored reference data may also include a user-specific radar reflection profile that can be used for identifying and distinguishing different persons.

At 206, a distance and an angle of the target object relative to the electronic device are determined by using an azimuth signal in the detection signal if the target object is a person. For example, the electronic device 110 determines a distance and an angle of the target object relative to the electronic device 110 based on an azimuth signal in the detection signal. When a person within the detection range is detected, a relative position and a relative angle of the target object relative to the electronic device 110 are detected from the azimuth signal. As such, it can be determined whether the target object can see the display apparatus of the electronic device 110. Next, an example of the visual angle will be described with reference to FIG. 3, and the relative positional relationship between each object and the electronic device 110 in this application scenario will be described with reference to FIG. 4.

Figure 3:
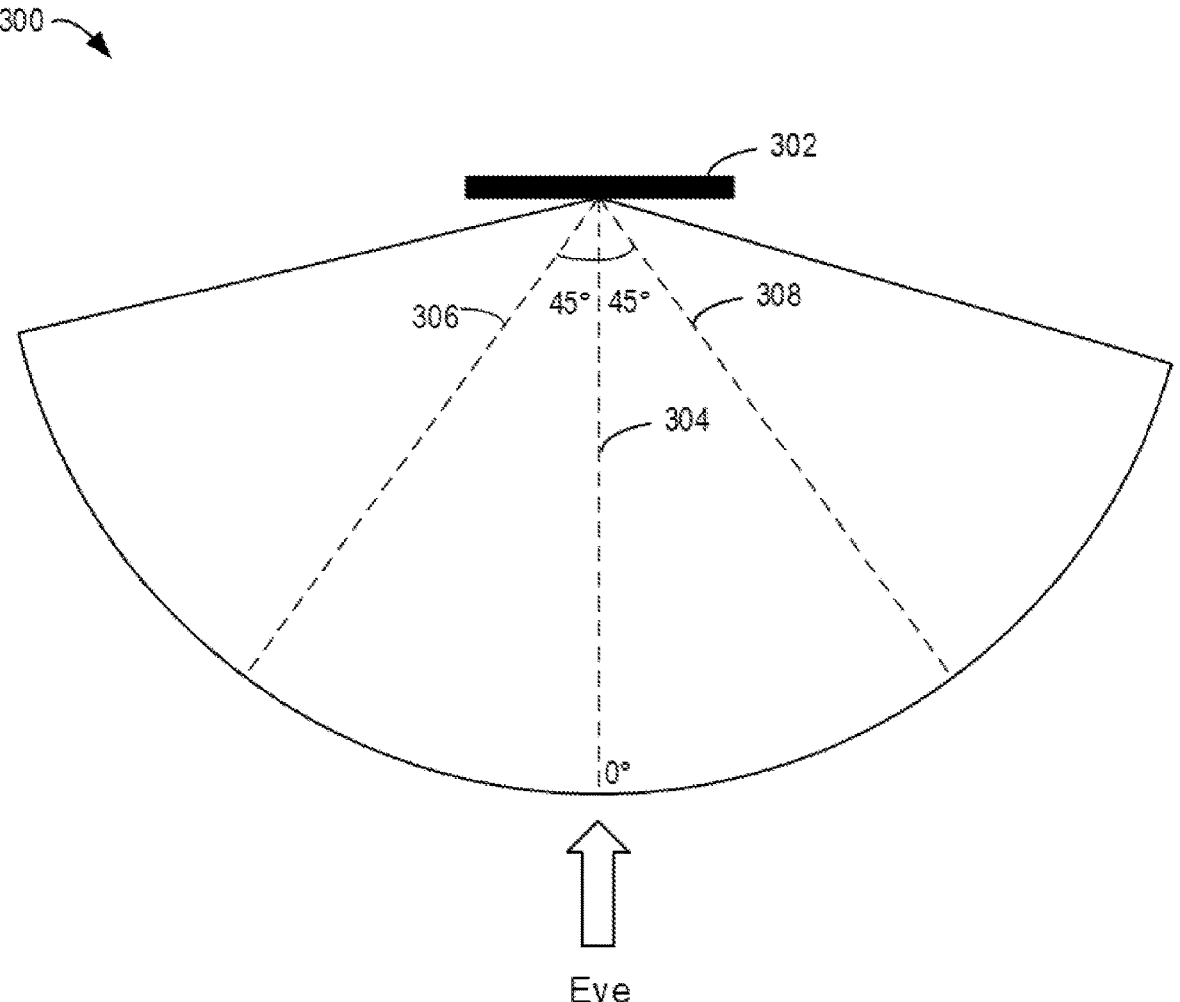
FIG. 3 is a schematic diagram of a plurality of angles of a field of view of a screen according to an embodiment of the present disclosure.

FIG. 3 is a schematic diagram of a plurality of angles 300 of a field of view of a screen 302 according to an embodiment of the present disclosure. As shown in the figure, when the line of sight 304 is perpendicular to the center of the screen 302, the field of view is 0 degrees. When the included angle between the line of sight 306 or the line of sight 308 and the center of the screen is 45 degrees, the field of view is plus or minus 45 degrees. That is, when the field of view is plus or minus 30 degrees, the screen should be seen clearly within this range. When the field of view is plus or minus 45 degrees, the screen should also be seen clearly within this range.

Figure 4:
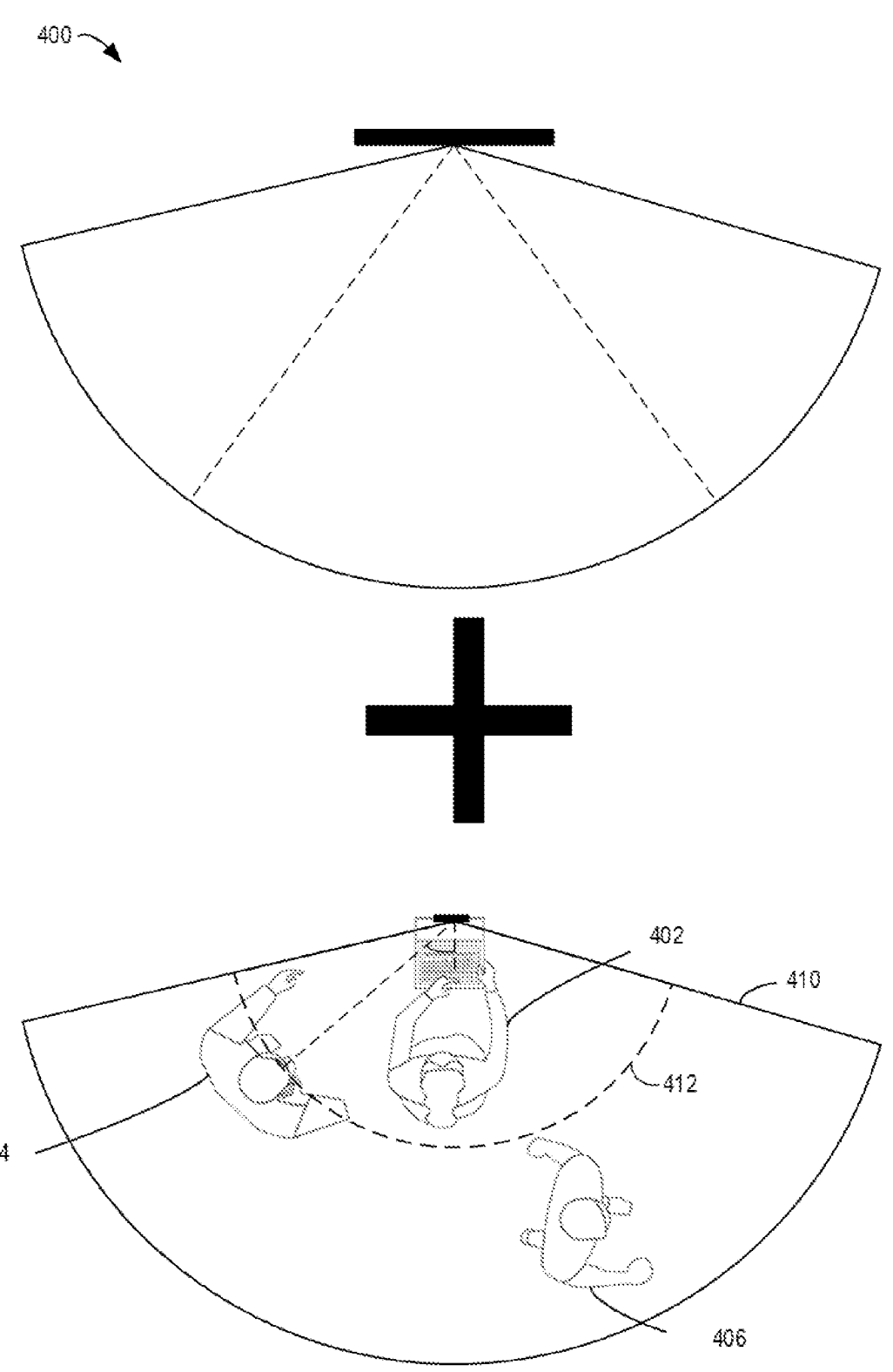
FIG. 4 is a schematic diagram of an example application scenario according to an embodiment of the present disclosure.

FIG. 4 is a schematic diagram of an example application scenario 400 according to an embodiment of the present disclosure. This scenario combines an electronic device with a screen with a variable viewing angle utilizing the solution of the present disclosure. As shown in FIG. 4, a first object 402 (e.g., a user of an electronic device) is accessing the electronic device. At this time, the radar apparatus of the electronic device detects that there is also a second object 404 (i.e., a target object) passing behind the first object 402 and a third object 406 (i.e., another target object) close to the first object 402 within its detection range 410. A threshold range 412 is also planned within the detection range. When the second object 404 enters the threshold range 412, it is considered that the second object 404 can see the display apparatus of the electronic device in an appropriate direction. According to the azimuth signal in the detection signal for the second object 404, it is detected that the second object 404 enters the threshold range 412, and the angle A of the second object 404 with respect to the normal of the display apparatus of the electronic device 110 is determined. According to the light emission range of the screen of the electronic device 110, the smaller the angle A, the better the viewing angle of the second object 404. Accordingly, the electronic device 110 also detects that the third object 406 is not within the threshold range 412 and is leaving the threshold range 412. Therefore, it can be determined that the third object 406 does not pose a risk.

Referring back to FIG. 2, at 208, the field of view of the screen is adjusted according to a visual mode of the electronic device based on the distance, a distance threshold, the angle, and a plurality of angle thresholds, where the visual mode indicates a visual angle of the screen of the electronic device. The screen of the electronic device may be a liquid crystal display (LCD) with a variable field of view.

Figure 5:
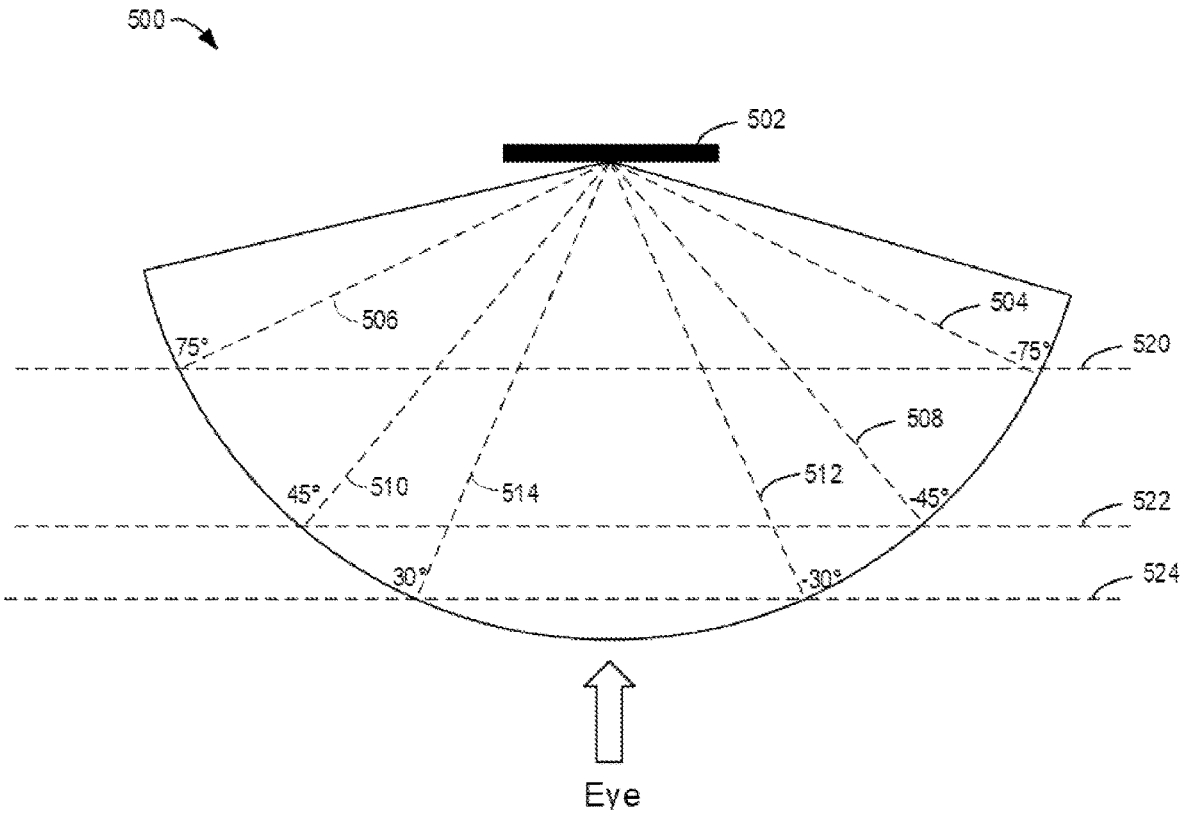
FIG. 5 is a schematic diagram of a plurality of thresholds according to an embodiment of the present disclosure.

By way of example, these thresholds will now be described with reference to FIG. 5. FIG. 5 is a schematic diagram of a plurality of thresholds 500 according to an embodiment of the present disclosure. First, the visual mode is introduced. It includes one or more modes among multiple modes. The multiple modes include a sharing mode, a relaxation mode, and a protection mode.

The sharing mode indicates that the visual angle is within the range of a first angle centered on the midpoint of the screen 502 (i.e., within the dashed lines 504 and 506). The sharing mode is suitable for sharing the screen, and can involve the normal viewing angle or the preferred and default viewing angle of the screen.

The relaxation mode indicates that the visual angle is within the range of a second angle centered on the midpoint of the screen 502, and the second angle is smaller than the first angle (i.e., within the dashed lines 508 and 510). The relaxation mode is suitable for easy use by a single user, allowing some position freedom in terms of the screen while preventing eavesdropping/snooping from the side.

The protection mode indicates that the visual angle is within the range of a third angle centered on the midpoint of the screen 502, and the third angle is smaller than the second angle (i.e., within the dashed lines 512 and 514). In the protection mode, when the user wants to avoid being snooped at all costs, the user should be almost directly facing the screen. Notably, the angle values shown in FIG. 5 are only examples, and are not limitations to the angle value of the field of view of the visual mode.

In some embodiments, when the visual mode of the electronic device is the sharing mode, and the distance between the target object and the electronic device is smaller than the distance threshold, and the angle is smaller than the first angle (e.g., 75 degrees), the field of view of the screen can be adjusted to be smaller than the angle so that the content of the screen is invisible to the target object. For example, when the target object is located between the screen 502 and the dotted line 520, the field of view of the screen can be reduced so that the content of the screen is invisible to the target object.

In some embodiments, when the visual mode of the electronic device is the relaxation mode, and the distance between the target object and the electronic device is smaller than the distance threshold, and the angle is smaller than the second angle (e.g., 45 degrees), the field of view of the screen can be adjusted to be smaller than the angle so that the content of the screen is invisible to the target object. For example, when the target object is located between the screen 502 and the dotted line 522, the field of view of the screen can be reduced so that the content of the screen is invisible to the target object.

In some embodiments, when the visual mode of the electronic device is the protection mode, and the distance between the target object and the electronic device is smaller than the distance threshold, and the angle is smaller than the third angle (e.g., 30 degrees), the field of view of the screen can be adjusted to be smaller than the angle so that the content of the screen is invisible to the target object. For example, when the target object is located between the screen 502 and the dotted line 524, the field of view of the screen can be reduced so that the content of the screen is invisible to the target object.

In some embodiments, the electronic device can issue an alarm indicating that the screen is being snooped or is otherwise susceptible to unauthorized viewing when any one of the following situations arises: if the angle between the target user and the screen is smaller than the first angle and the visual mode is the sharing mode, or if the angle between the target user and the screen is smaller than the second angle and the visual mode is the relaxation mode, or if the angle between the target user and the screen is smaller than the third angle and the visual mode is the protection mode. The electronic device may issue the alarm indicating that the screen is being snooped or is otherwise susceptible to unauthorized viewing.

In some embodiments, the electronic device can adjust the field of view of the screen according to the visual mode based on the distance between the target object and the screen, a plurality of distance thresholds, the angle between the target object and the screen, and a plurality of angle thresholds. For example, if the target object is at the distance between the screen 502 and the dotted line 520 (also called the first distance), the field of view of 75 degrees may not be enough because the distance from the screen is relatively close, and at this time the threshold angle in the sharing mode can be increased. For another example, if the target object is outside the dotted line 524 (i.e., beyond the third distance), the field of view of 30 degrees may not be enough because the distance from the screen is far, and at this time the threshold angle in the protection mode can be increased. As a further example, if the target object is at a distance between the dotted line 520 and the dotted line 522 (the distance between the screen 502 and the dotted line 522 is also called the second distance), then the angle of the visual mode may be unchanged.

As such, potential snooping can be automatically detected, and the field of view of the screen can be reduced accordingly to avoid snooping. In some embodiments, the field of view can also be seamlessly adapted based on a predetermined visual mode.

Figure 6:
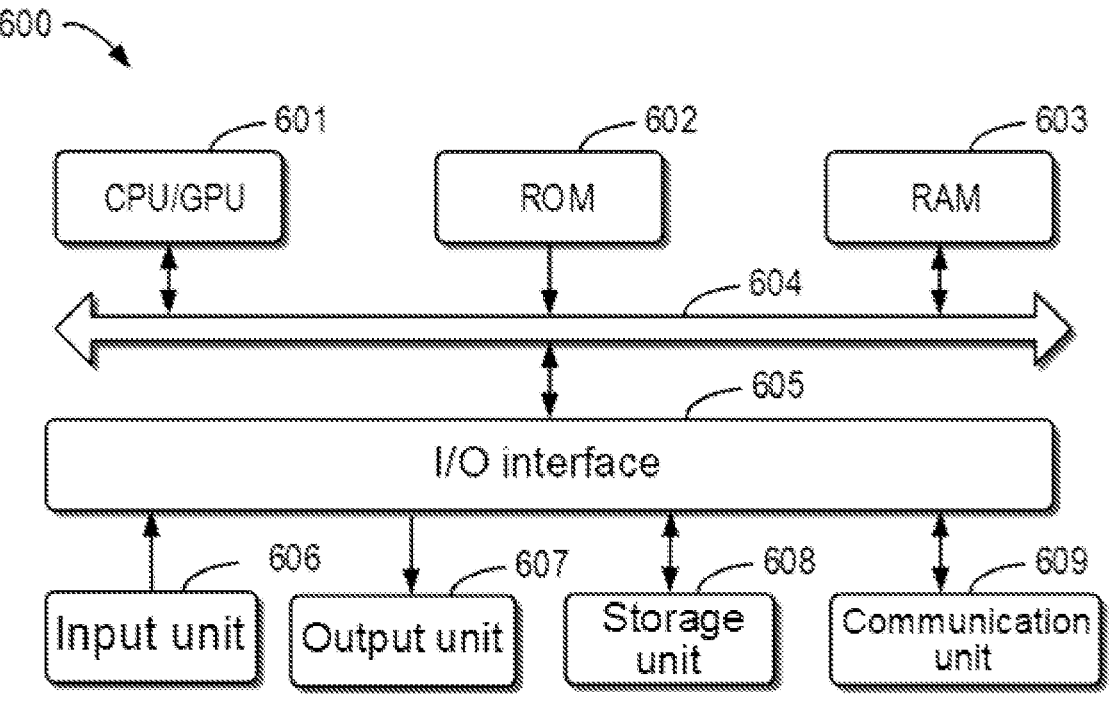
FIG. 6 is a block diagram of an example device that can be used to implement embodiments of the present disclosure.

FIG. 6 is a block diagram of an example device 600 that can be used to implement embodiments of the present disclosure. As shown in FIG. 6, the device 600 includes a central processing unit (CPU) and/or graphics processing unit (GPU) 601 that can perform various appropriate actions and processing according to computer program instructions stored in a read-only memory (ROM) 602 or computer program instructions loaded from a storage unit 608 to a random access memory (RAM) 603. Various programs and data required for the operation of the device 600 may also be stored in the RAM 603. The CPU/GPU 601, the ROM 602, and the RAM 603 are connected to each other through a bus 604. An input/output (I/O) interface 605 is also connected to the bus 604.

Multiple components in the device 600 are connected to the I/O interface 605, including: an input unit 606, such as a keyboard, a mouse, and the like; an output unit 607, such as various types of displays, speakers, and the like; the storage unit 608, such as a magnetic disk, a compact disc, and the like; and a communication unit 609, such as a network card, a modem, a wireless communication transceiver, and the like. The communication unit 609 allows the device 600 to exchange information/data with other devices via a computer network, such as the Internet, and/or various telecommunication networks.

The various processes and processing described above, such as the method 200, can be performed by the CPU/GPU 601. For example, in some embodiments, the method 200 may be implemented as a computer software program that is tangibly included in a machine-readable medium, such as the storage unit 608. In some embodiments, part of or all the computer program may be loaded and/or installed onto the device 600 via the ROM 602 and/or the communication unit 609. One or more actions of the method 200 described above can be performed when the computer program is loaded into the RAM 603 and executed by the CPU/GPU 601.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that can maintain and store instructions to be used by an instruction execution device. For example, the computer-readable storage medium may be, but is not limited to, an electrical storage device, a magnetic storage device, an optical storage device, an electromagnetic storage device, a semiconductor storage device, or any suitable combination thereof. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination thereof. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/ processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit can execute the computer-readable program instructions so as to implement various aspects of the present disclosure.

Various aspects of the present disclosure are described herein with reference to flowcharts and/or block diagrams of the method, the apparatus (system), and the computer program product according to embodiments of the present disclosure. It should be understood that each block of the flowcharts and/or the block diagrams and combinations of blocks in the flowcharts and/or the block diagrams may be implemented by the computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flowcharts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flowcharts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flowcharts and/or block diagrams.

The flowcharts and block diagrams in the drawings illustrate the architectures, functions, and operations of possible implementations of the systems, methods, and computer program products according to various embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flowcharts as well as a combination of blocks in the block diagrams and/or flowcharts may be implemented using a dedicated hardware-based system that executes specified functions or actions, or using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms used herein is intended to best explain the principles and practical applications of the various embodiments and their associated technical improvements, so as to enable persons of ordinary skill in the art to understand the various embodiments disclosed herein.

What is claimed is:

1. A method comprising:
   detecting a target object within a detection range by using a radar apparatus of an electronic device, the electronic device having a screen with a variable field of view that is controllably adjustable to provide a plurality of different visual angles measured relative to a line perpendicular to a plane of a viewing surface of the screen, each of the different visual angles corresponding to a different field of view of the screen;
   determining whether the target object is a person by using a biometric signal in a detection signal emitted by the radar apparatus in response to detecting the target object;

determining a distance and an angle of the target object relative to the electronic device by using an azimuth signal in the detection signal in response to the target object being a person; and adjusting the field of view of the screen of the electronic device according to a visual mode of the electronic device based on the distance, a distance threshold, the angle, and a plurality of angle thresholds, where the visual mode indicates a particular one of the different visual angles of the screen of the electronic device, the electronic device having a plurality of visual modes including at least first, second and third different visual modes corresponding to respective first, second and third visual angles providing respective first, second and third different fields of view of the screen.

2. The method according to claim 1, wherein the visual mode comprises one or more modes of a plurality of modes, the plurality of modes comprising:

a sharing mode indicating that the visual angle is within a range of a first angle centered at a midpoint of the screen;

a relaxation mode indicating that the visual angle is within a range of a second angle centered at the midpoint of the screen, the second angle being smaller than the first angle; and a protection mode indicating that the visual angle is within a range of a third angle centered at the midpoint of the screen, the third angle being smaller than the second angle.

3. The method according to claim 2, wherein adjusting the field of view of the screen according to a visual mode of the electronic device based on the distance, a distance threshold, the angle, and a plurality of angle thresholds comprises:

determining that the visual mode is the sharing mode, the distance is smaller than the distance threshold, and the angle is smaller than the first angle; and adjusting the field of view of the screen to be smaller than the angle, so that content of the screen is invisible to the target object.

4. The method according to claim 2, wherein adjusting the field of view of the screen according to a visual mode of the electronic device based on the distance, a distance threshold, the angle, and a plurality of angle thresholds comprises:

determining that the visual mode is the relaxation mode, the distance is smaller than the distance threshold, and the angle is smaller than the second angle; and adjusting the field of view of the screen to be smaller than the angle, so that content of the screen is invisible to the target object.

5. The method according to claim 2, wherein adjusting the field of view of the screen according to a visual mode of the electronic device based on the distance, a distance threshold, the angle, and a plurality of angle thresholds comprises:

determining that the visual mode is the protection mode, the distance is smaller than the distance threshold, and the angle is smaller than the third angle; and adjusting the field of view of the screen to be smaller than the angle, so that content of the screen is invisible to the target object.

6. The method according to claim 2, further comprising:

in response to the angle being smaller than the first angle and the visual mode being the sharing mode, issuing an alarm indicating that the screen is susceptible to unauthorized viewing;

in response to the angle being smaller than the second angle and the visual mode being the relaxation mode, issuing an alarm indicating that the screen is susceptible to unauthorized viewing; or in response to the angle being smaller than the third angle and the visual mode being the protection mode, issuing an alarm indicating that the screen is susceptible to unauthorized viewing.

7. The method according to claim 2, wherein adjusting the field of view of the screen according to a visual mode of the electronic device based on the distance, a distance threshold, the angle, and a plurality of angle thresholds comprises:

adjusting the field of view of the screen according to the visual mode based on the distance, a plurality of distance thresholds, the angle, and the plurality of angle thresholds.

8. The method according to claim 7, wherein the plurality of distance thresholds comprise:

a first distance associated with the sharing mode;

a second distance associated with the relaxation mode, the second distance being greater than the first distance; and a third distance associated with the protection mode, the third distance being greater than the second distance.

9. The method according to claim 2, wherein the visual mode is set to the sharing mode by default.

10. The method according to claim 1, wherein the screen comprises a liquid crystal display (LCD) with a variable field of view.

11. An electronic device, comprising:

at least one processor; and memory coupled to the at least one processor and having instructions stored therein, wherein the instructions, when executed by the at least one processor, cause the electronic device to perform actions comprising:

detecting a target object within a detection range by using a radar apparatus of the electronic device, the electronic device having a screen with a variable field of view that is controllably adjustable to provide a plurality of different visual angles measured relative to a line perpendicular to a plane of a viewing surface of the screen, each of the different visual angles corresponding to a different field of view of the screen;

determining whether the target object is a person by using a biometric signal in a detection signal emitted by the radar apparatus in response to detecting the target object;

determining a distance and an angle of the target object relative to the electronic device by using an azimuth signal in the detection signal in response to the target object being a person; and adjusting the field of view of the screen of the electronic device according to a visual mode of the electronic device based on the distance, a distance threshold, the angle, and a plurality of angle thresholds, where the visual mode indicates a particular one of the different visual angles of the screen of the electronic device, the electronic device having a plurality of visual modes including at least first, second and third different visual modes corresponding to respective first, second and third visual angles providing respective first, second and third different fields of view of the screen.

12. The electronic device according to claim 11, wherein the visual mode comprises one or more modes of a plurality of modes, the plurality of modes comprising:

a sharing mode indicating that the visual angle is within a range of a first angle centered at a midpoint of the screen;

a relaxation mode indicating that the visual angle is within a range of a second angle centered at the midpoint of the screen, the second angle being smaller than the first angle; and a protection mode indicating that the visual angle is within a range of a third angle centered at the midpoint of the screen, the third angle being smaller than the second angle.

13. The electronic device according to claim 12, wherein adjusting the field of view of the screen according to a visual mode of the electronic device based on the distance, a distance threshold, the angle, and a plurality of angle thresholds comprises:

determining that the visual mode is the sharing mode, the distance is smaller than the distance threshold, and the angle is smaller than the first angle; and adjusting the field of view of the screen to be smaller than the angle, so that content of the screen is invisible to the target object.

14. The electronic device according to claim 12, wherein adjusting the field of view of the screen according to a visual mode of the electronic device based on the distance, a distance threshold, the angle, and a plurality of angle thresholds comprises:

determining that the visual mode is the relaxation mode, the distance is smaller than the distance threshold, and the angle is smaller than the second angle; and adjusting the field of view of the screen to be smaller than the angle, so that content of the screen is invisible to the target object.

15. The electronic device according to claim 12, wherein adjusting the field of view of the screen according to a visual mode of the electronic device based on the distance, a distance threshold, the angle, and a plurality of angle thresholds comprises:

determining that the visual mode is the protection mode, the distance is smaller than the distance threshold, and the angle is smaller than the third angle; and adjusting the field of view of the screen to be smaller than the angle, so that content of the screen is invisible to the target object.

16. The electronic device according to claim 12, wherein the actions further comprise:

in response to the angle being smaller than the first angle and the visual mode being the sharing mode, issuing an alarm indicating that the screen is susceptible to unauthorized viewing;

in response to the angle being smaller than the second angle and the visual mode being the relaxation mode, issuing an alarm indicating that the screen is susceptible to unauthorized viewing; or in response to the angle being smaller than the third angle and the visual mode being the protection mode, issuing an alarm indicating that the screen is susceptible to unauthorized viewing.

17. The electronic device according to claim 12, wherein adjusting the field of view of the screen according to a visual mode of the electronic device based on the distance, a distance threshold, the angle, and a plurality of angle thresholds comprises:

adjusting the field of view of the screen according to the visual mode based on the distance, a plurality of distance thresholds, the angle, and the plurality of angle thresholds.

18. The electronic device according to claim 17, wherein the plurality of distance thresholds comprise:

a first distance associated with the sharing mode;

a second distance associated with the relaxation mode, the second distance being greater than the first distance; and a third distance associated with the protection mode, the third distance being greater than the second distance.

19. The electronic device according to claim 12, wherein:

the visual mode is set to the sharing mode by default; and the screen comprises a liquid crystal display (LCD) with a variable field of view.

20. A computer program product comprising a non-transitory computer-readable medium having machine-executable instructions stored therein, wherein the machine-executable instructions, when executed by a machine, cause the machine to perform actions comprising:

detecting a target object within a detection range by using a radar apparatus of an electronic device, the electronic device having a screen with a variable field of view that is controllably adjustable to provide a plurality of different visual angles measured relative to a line perpendicular to a plane of a viewing surface of the screen, each of the different visual angles corresponding to a different field of view of the screen;

determining whether the target object is a person by using a biometric signal in a detection signal emitted by the radar apparatus in response to detecting the target object;

determining a distance and an angle of the target object relative to the electronic device by using an azimuth signal in the detection signal in response to the target object being a person; and adjusting the field of view of the screen of the electronic device according to a visual mode of the electronic device based on the distance, a distance threshold, the angle, and a plurality of angle thresholds, where the visual mode indicates a particular one of the different visual angles of the screen of the electronic device, the electronic device having a plurality of visual modes including at least first, second and third different visual modes corresponding to respective first, second and third visual angles providing respective first, second and third different fields of view of the screen.

* * * * *